(12) United States Patent  (10) Patent No.: US 8,839,375 B2
Radzikowski et al.  (45) Date of Patent: Sep. 16, 2014

(54) MANAGING DISTRIBUTED OPERATING SYSTEM PHYSICAL RESOURCES

(75) Inventors: Eric Radzikowski, Redmond, WA (US); Shailesh Padmakar Joshi, Redmond, WA (US); Asad Yaqoob, Redmond, WA (US); Igal Figlin, Redmond, WA (US); Charles William Kaufman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/480,816

(22) Filed: May 25, 2012

(65) Prior Publication Data

US 2013/0318571 A1  Nov. 28, 2013

(51) Int. Cl.
*H04L 29/06* (2006.01)
*G06F 21/62* (2013.01)

(52) U.S. Cl.
CPC .................................. *G06F 21/6218* (2013.01)
USPC .................................................. 726/4; 726/27

(58) Field of Classification Search
USPC ............................................................. 726/4
See application file for complete search history.

(56) References Cited

U.S. PATENT DOCUMENTS

| | | | |
|---|---|---|---|
| 7,743,127 B2 | 6/2010 | Santos et al. | |
| 2004/0064729 A1* | 4/2004 | Yellepeddy | 713/201 |
| 2004/0230753 A1* | 11/2004 | Amiri et al. | 711/147 |
| 2005/0071657 A1* | 3/2005 | Ryan | 713/193 |
| 2007/0067435 A1 | 3/2007 | Landis et al. | |
| 2008/0022120 A1* | 1/2008 | Factor et al. | 713/184 |
| 2008/0104705 A1 | 5/2008 | Hasbun | |
| 2008/0244736 A1 | 10/2008 | Lampson et al. | |
| 2009/0271498 A1 | 10/2009 | Cable | |
| 2009/0288146 A1* | 11/2009 | Olsson et al. | 726/4 |
| 2011/0154324 A1 | 6/2011 | Pagan et al. | |
| 2011/0302290 A1 | 12/2011 | Westerfeld et al. | |
| 2012/0054624 A1 | 3/2012 | Owens, Jr. et al. | |
| 2012/0260019 A1* | 10/2012 | Malaiyandisamy et al. | 711/6 |

FOREIGN PATENT DOCUMENTS

WO  WO2011047063  4/2011

OTHER PUBLICATIONS

Desai, Anil, "Managing Hyper-V's Security Permissions", Published on: Sep. 2008, Available at: http://searchservervirtualization.techtarget.com/tip/Managing-Hyper-Vs-security-permissions.

"Cisco Data Center Network Manager Release 5.2 (Converged) Data Sheet", Retrieved on: Apr. 9, 2012, Available at: http://www.cisco.com/en/US/prod/collateral/netmgtsw/ps6505/ps9369/data_sheet_c78-639737.html.

"Cisco Trust-Sec Solution Overview", Published on: Aug. 11, 2010, Available at: http://www.cisco.com/en/US/solutions/collateral/ns170/ns896/ns1051/solution_overview_c22-591771.html.

* cited by examiner

*Primary Examiner* — Yogesh Paliwal
(74) *Attorney, Agent, or Firm* — Ben Tabor; David Andrews; Micky Minhas

(57) ABSTRACT

Providing a uniform security model to heterogeneous devices in a distributed computing environment. A method includes storing information about a plurality of device security models, including device credentials. The method further includes storing information about a uniform security model, including access rights for various principals. The method further includes identifying a principal. Based on the identified principal, access is provided to the principal according to the uniform security model, based on the device security model credentials.

20 Claims, 3 Drawing Sheets

MANAGING DISTRIBUTED OPERATING SYSTEM PHYSICAL RESOURCES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

The connections allow a computing system to access services at other computing systems and to quickly and efficiently receive application data from other computing systems. Further, interconnected computing systems can be used to implement cluster computing systems where several discrete systems work together to accomplish a computing task assigned to the cluster as a whole. Some such systems may have all, or a portion of the cluster deployed in the cloud. Cloud computing allows for computing resources to be provided as services rather than a deliverable product. In particular, computing power, software, information, etc. are provided (for example, through a rental agreement) over a network, such as the Internet.

A conventional operating system manages resources inside a single physical machine. A distributed operating system can manage resources beyond single physical machine boundaries, such as for example, large pools of physical resources and virtual resources (e.g., physical machines, virtual machines, terminal consoles, switches, power distribution units, etc). For example, a cloud computing environment may implement a distributed operating system to manage cloud computing resources.

When a distributed operating system is deployed in or across datacenters, it relies on the correct configuration of devices managing the datacenters. Sometimes, configuration of those devices is handed off to the distributed operating system, either fully or partially, to support the datacenter architecture and growth. The distributed operating system may manage the configuration solely (i.e., all the configuration is managed by distributed operating system) or partially (i.e., only parts of the configuration are managed by the distributed operating system).

This creates a set of distinct problems for managing datacenter devices, such as power distribution units, terminal consoles, datacenter routers, datacenter switches, etc. First, a configuration/usage conflict may occur when both distributed operating system and humans try to access the same underlying devices. For example, usage of the terminal services console to a recover physical node by a datacenter operation may interfere with the usage of this console by the distributed operating system to attempt some operation on the node. Second, the authorization and authentication model may be broken as users possessing administrative rights or performing equivalent operations on the underlying physical devices are effectively overriding the distributed operating system security model. Third, a rogue user may use underlying datacenter devices as a security hole into the distributed operating system by using a permission model defined on a datacenter device to circumvent a different permission model defined for the distributed operating system. Finally, the auditing model may be broken, as device auditing occurs independently from the rest of the datacenter resources managed by the distributed operating system. Each of these issues may be related to the fact that data devices typically implement a very simple security model, for example, if a user knows the password for a device, they can do anything; if they do not, they cannot do anything.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment disclosed herein is directed to a method of providing a uniform security model to heterogeneous devices in a distributed computing environment. The method includes storing information about a plurality of devices. The device security model includes credentials for accessing one or more devices. The method further includes storing information about a uniform security model. The uniform security model defines what access rights various principals have to the one or more devices. The method further includes identifying a principal. Based on the identified principal, the method further includes providing access to the identified principal according to the uniform security model by using one or more stored credentials from the device security models.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include an agent that mediates all management access to devices in a distributed cloud environment. The devices typically implement a very simple security model, for example, if a user knows the password, they can do anything; if they do not, they cannot do anything. However, some embodiments described herein implement a system with an agent that implements more granular access controls. For example, Members of the XYZ group can only read the status of a device, while members of the ABC group can make some targeted updates, and members of the DEF group can make any change to the device but cannot do so bypassing an audit log that says who did what and when.

The agent in this case has sole possession of the password (or other credentials recognized by the device), and it authenticates incoming requests, validates whether the requests are allowed by an access policy or security model, and if so the agent requests that the device perform the operation using the credentials that it holds.

Embodiments may implement various features and/or functionality. For example, the agent may keep a log of all operations performed. The agent may have sole access to the credentials used to access devices. The agent may obtain sole access to the credentials by updating the credentials on the device to a value the agent chooses and does not divulge, except in limited circumstances, the credentials to any third party. The agent can divulge the credentials to a properly authenticated requestor, but after doing so the agent considers the credentials compromised and subsequently updates the credentials on the device to a value the agent chooses and does not divulge the updated credentials, except in limited circumstances, to any third party. The agent may be able to perform some series of operations on behalf of a requestor where it would not be willing to perform them individually in order to maintain some invariant in the state of the device. The agent may be able to implement separation of duty by only performing some operation if requested by one requestor and having the operation confirmed by a second different requestor. A single entity can be an agent for multiple devices where the access policies for the various devices are all the same. A single entity can be an agent for multiple devices where the access policies for the various devices are different. The agent may periodically poll the state of a device, compare it to the expected state, and trigger an alarm if they differ.

Figure 1:
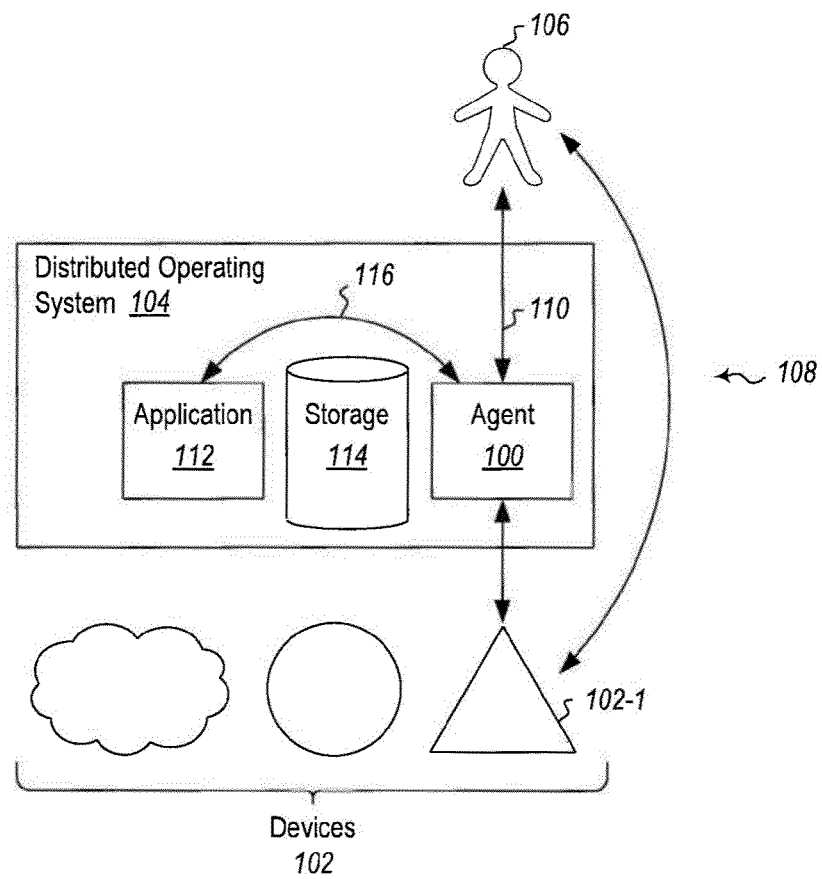
FIG. 1 illustrates a distributed operating system managing a set of distributed devices.

Referring now to FIG. 1, an example agent 100 is illustrated. FIG. 1 illustrates that some embodiments may implement protected devices 102, which could be, for example, a managed datacenter power distribution unit, router, switch, terminal server, etc. Embodiments may include a distributed operating system 104 that manages access to and protects datacenter devices 102 using the agent 100, needed for the operation of the distributed operating system or software running on top of it. The agent 100 may include abstract permissions, authentication, authorization, and auditing models for the protected devices 102. The distributed operating system 104 may provide auditing for protected device operations outside of the device boundaries. The agent 100 may manage the device version and configuration to restrict external access to the devices 102. Access and management is performed by the agent 100. The agent 100 may provide management access to underlying resources (e.g., network devices).

A distributed cloud operating system, or distributed operating system as used herein is a system allowing allocation of datacenter resources (VMs, IP addresses, etc) and providing a platform for execution of the software across datacenter with high redundancy, running in multiple instances and fault domains.

Embodiments may be implemented where a distributed operating system 104 is the sole owner of the devices 102 it manages, using the agent 100. Ordinarily, Managed devices 102 would be able to be accessed by user 106 directly (such as through path 108 to the device 102-1). However, embodiments may prevent this from occurring by the agent 100 controlling the password or other credentials to the device 102-1 and keeping the credentials secret from the user 106. The agent 100 can provide outside access through the distributed operating system 104 (such as through path 110 to the device 102-1). Providing access through the distributed operating system 104 may be implemented by the agent 100 managing the keys of the devices 102 and/or username/password access needed to access the devices, thus not allowing a direct connection to the devices, as the keys of the devices are not directly exposed by the distributed operating system.

The following illustrates an example. When a network resource is added to the datacenter, a "buildout" process occurs. During the buildout process, firmware is upgraded and baseline configuration is enforced for the device. Additionally, a device identification key is generated. The private key portion of the device identification key is stored on the device while the public key portion of the device identification key is stored in the distributed operating system central storage 114. The device key is used to validate that the device being connected to is the right device and not an imposter.

Once trust between the device and agent 100 is created, it is managed by the agent 100. In some embodiments rotating key operations and credential creation operations may be performed. This can be done as a security measure to guard against compromised credentials.

For rotating key operations for the device, the agent 100 may ask the device to renew the keys and share the public key or renew the keys for the devices and update them. This may occur over existing secure channels. Creating credentials on the device that will be used to identify the connections from the distributed operating system may involve the agent 100 connecting to the device directly either for service provisioning needs (as illustrated by the path 116 from an application 112 to a device 102-1) or on behalf of the end user 106 (as illustrated by the path 110 to the device 102-1).

Figure 2:
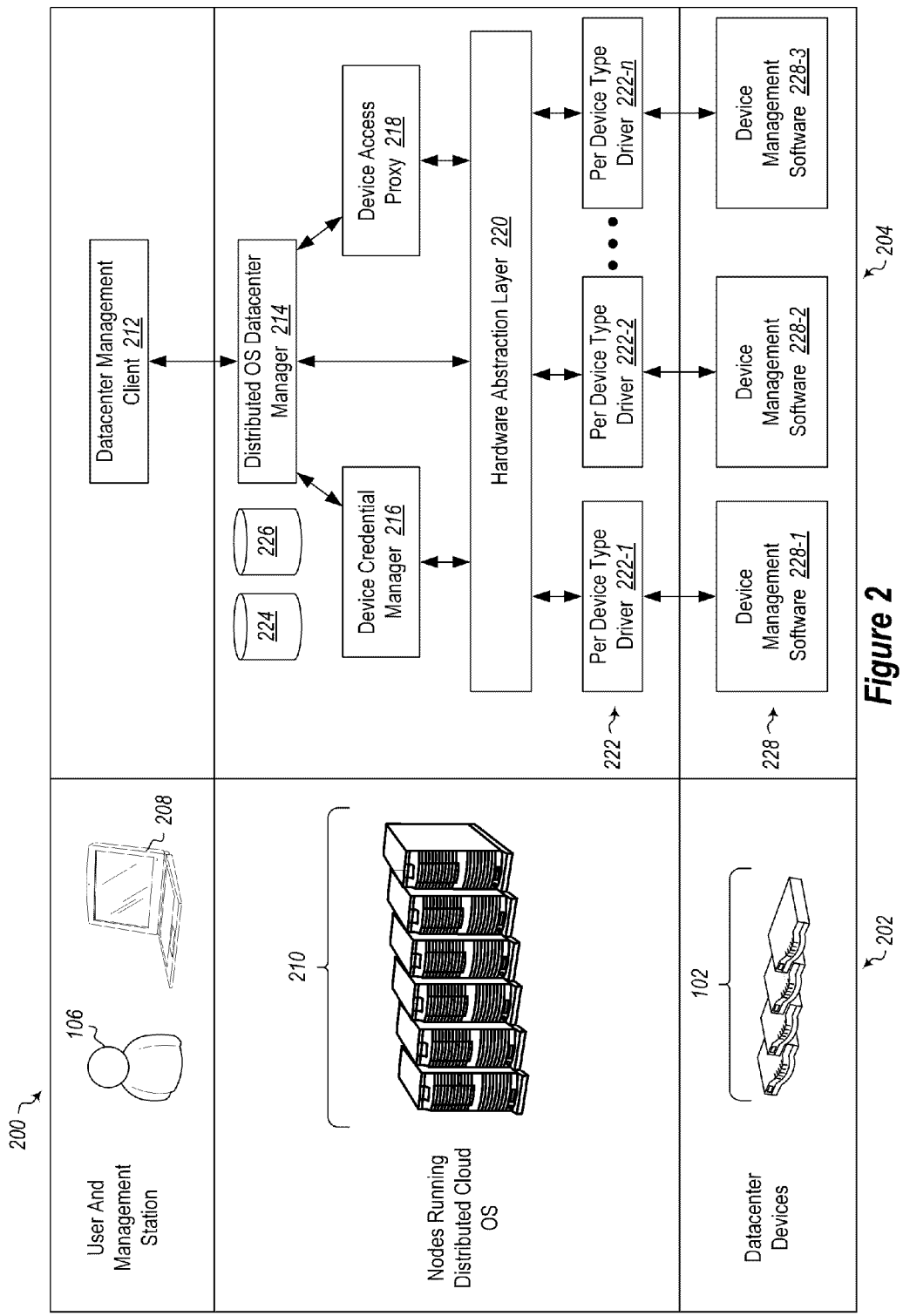
FIG. 2 illustrates software and hardware stacks for a distributed operating system and distributed devices.

Referring now to FIG. 2, additional details are illustrated. In particular, FIG. 2 illustrates a stack 200 including a hardware stack 202 and a software stack 204 illustrating various details. FIG. 2 illustrates a user 106 that in this example is a human user. The user 106 interacts with a management station 208. FIG. 2 also illustrates in the hardware stack 202 a set of nodes 210 or physical machines running the distributed operating system 104 (see FIG. 1). FIG. 2 further illustrates in the hardware stack 202 managed devices 102.

In the software stack 204, FIG. 2 illustrates a datacenter management client 212 run by the management station 208 and controlled by the user 106.

FIG. 2 illustrates various software components run on the nodes 210 running the distributed cloud operating system. These components include a distributed operating system datacenter manager 214, a device credential manager 216, a device access proxy 218, a hardware abstraction layer 220, and a set of per device drivers 222 (illustrated specifically at 222-1, 222-2 through 222-n). The nodes 210 running the distributed operating system may also include uniform security model store 224 and a device security model store 226. These stores store policy information such as user policies, access restrictions, permissions, and the like for users and applications using the distributed operating system 104 and the devices respectively. These will be discussed in more detail below.

The distributed operating system datacenter manager 214 includes functionality for interacting with the datacenter management client 212 and interacting with the device credential manager 216, the device access proxy 218, and the hardware abstraction layer 220 to control principal access to the datacenter devices 102 through the device drivers 222. For example, the device access proxy 218, device credential manager 216 and the hardware abstraction layer 220 can translate one or more uniform security model claims from the uniform security model store 224 to one or more device security model claims from the device security model store 226 to provide access to principals (such as users 106 or applications 212) to the plurality of distributed system devices 102 using the per device type drivers 222 and the embedded management software 228 based on the device security model claims.

The software stack also includes a set of device management software 228 embedded in each device in the set of devices 102 (e.g. device management software 228-1, 228-2 and 228-3). Each of the devices in the set of devices 102 includes device management software or firmware embedded in the device to allow a principal to access, manage, and/or control the device. While this access, management and/or control can traditionally be performed independently using interfaces in the device management software 228, FIG. 2 illustrates that the distributed operating system 104 can be configured to make use of the device management software 228, such that access is routed through the distributed operating system 104, and to prevent direct connection by a user to the device. This allows for the distributed operating system 104 to control and manage access, provide conflict resolution, using an agent 100 as illustrated in FIG. 1, as different principals try to access a particular device, provide logging functionality, etc. Additional details are illustrated below.

Device Management Model Abstraction

Embodiments may be implemented by abstracting common operations from the datacenter devices 102. In some embodiments, common operations executed by principals (such as software modules) in the distributed operating system 104, as well by external principals (such as end users 106), are given as commands to the agent 100 and executed on behalf of the principals. Various examples are now illustrated.

Some embodiments may implement devices 102 that are power distribution units. Power distribution units can be used to power-on/power-off dormant nodes (physical server), restart nodes (physical server), get power status of the server, etc.

Some embodiments may implement devices 102 that are serial terminal servers. Serial terminal servers issue commands on a management console for a specific server, enter serial management interfaces, capture serial output, etc.

Some embodiments may implement devices 102 that are switches, routers, firewalls, other intrusion detection systems, etc. This may include adding network configuration for a device's port configuration, changing networking configuration for a device (VLANs, routes), etc.

Devices added to the system may have an associated hardware abstraction layer driver to present a basic set of capabilities of the device. Additional capabilities can be configured through a buildout process and managed manually. Alternatively, capabilities can be managed using tools implemented outside of the basic abstraction model. Thus, a collection of drivers for the devices in the datacenter creates an abstraction layer for non-uniform device management.

Permissions Model

While operating in the model described above, auditing may be implemented by the distributed operating system, which (using the device access proxy 218) proxies the calls to the datacenter's devices 102 and audits them externally, thus obviating any need for configuring auditing for mainline scenarios. Thus, there is less risk that the auditing can be circumvented, as the auditing mechanisms are fully external to the devices 102.

The permissions model, in the illustrated example, is also defined by the distributed operating system at the device credential manager 216. For example, administrators with sufficient access levels defined to a specific node or rack can execute operations on the permissions model, rather than all the administrators having access to the specific datacenter infrastructure device.

Baseline Monitoring and RMA Process

Embodiments may provide administrative access to the devices 102, thus the agent 100 can perform validation and backup of the configuration as a result of the user management operations and distributed operating system changes to the configuration. Furthermore, if a device is broken or destroyed, a replacement device can apply the same configuration and start the operation in place instead of the faulty device.

Embodiments may include functionality for backing up security information and device configuration as a part of the distributed operating system configuration. A distributed operating system configuration is accurate at some point of time. A checkpoint can be created to store configuration details at this point in time. Thus, underlying managed devices' assumed configurations will be checkpointed and backed up as a part of the operating system checkpoint backup. However, secret keys to access a device need to match in the distributed operating system and the device.

However, restored operating system configurations and/or the restored device configurations are not guaranteed to be restored to the exact synchronized state due to clock differences, incomplete configuration operations, etc. Thus, transactions may be applied when configuring the device and current/previous configurations may be saved and matched during restore. For example, the key replacement operation might have succeeded in the distributed operating system, but was not saved in the device due to power outage. Thus, the powered up device may need to be accessed with the previous key.

Key Rotation

Embodiments may include frequent secret rotation on the managed devices 102. This can be done to minimize damage occurring from compromised keys.

Emergency Access

Embodiments include functionality to account for emergency access to underlying datacenter devices 102 when parts of the distributed operating system 104 or agent 100 are malfunctioning or network access is partially or fully down.

In these instances the management through the distributed operating system mechanisms may be difficult or impossible. Embodiments may include a process to extract device secrets from the distributed operating system device policy store 226, which includes a device secret store. Extracting the key from the distributed operating system secret store allows for using the key for some time until the distributed operating system 102 is back online. However, in the moment when the key is extracted from the operating system secret store it is marked as "invalid". When the distributed operating system is back online, the extracted keys marked invalid are rotated on all the relevant managed devices 102.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
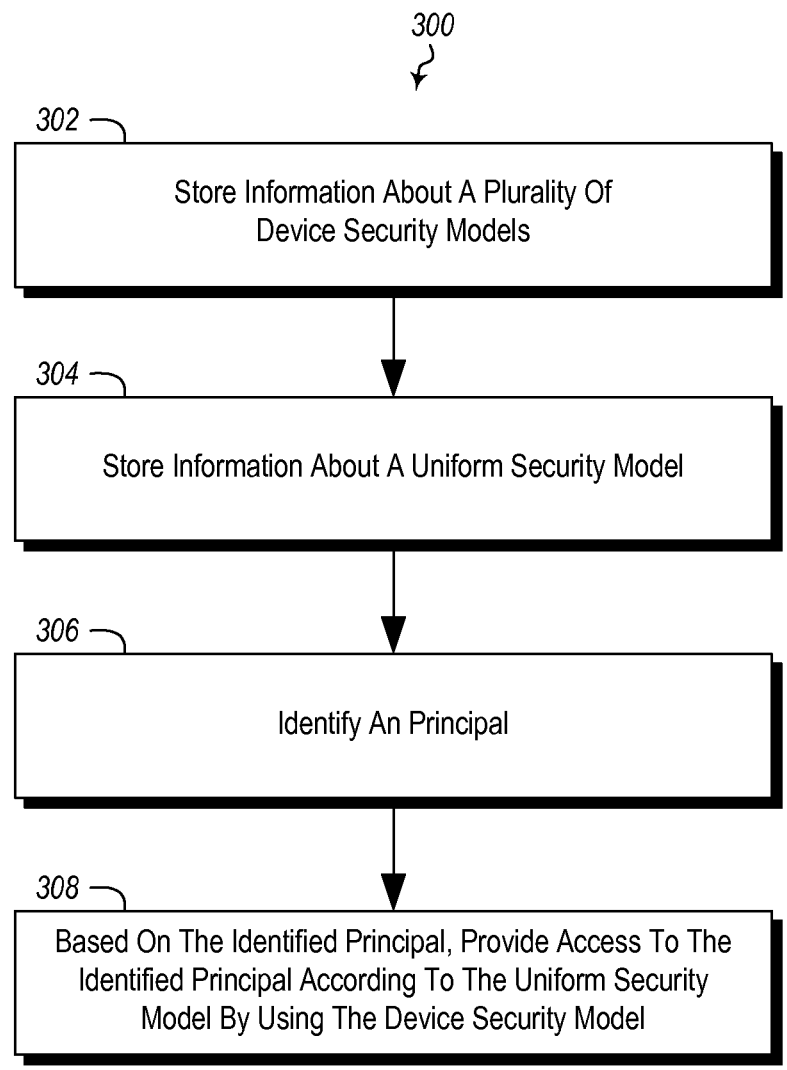
FIG. 3 illustrates a method of providing a uniform security model to heterogeneous devices in a distributed computing environment.

Referring now to FIG. 3, a method 300 is illustrated. The method 300 includes acts for providing a uniform security model to heterogeneous devices in a distributed computing environment. The method 300 includes storing information about a plurality of device security models (act 302). For example, FIG. 2 illustrates a device security model store 226. The device security model store 226 may include credentials needed to access one or more devices 102. The device security model may include other information such as required permissions, device limitations, device restrictions, etc. For example, devices may limit the number of principals that can connect to a device at any given time. This information may be stored on the device security model store 226. Other information that may be stored in the device security model store 226 may include certificates, passwords, configuration exceptions, special access lists, special networking configuration, etc.

The method 300 further includes storing information about a uniform security model (act 304). For example, FIG. 2 illustrates a uniform security model store 224. The uniform security model may define what access rights various principals have to the one or more devices. The uniform security model store 224 may include principal policy information. For example, the uniform security model store 224 could be role based restrictions. For example, certain roles may be restricted to accessing devices 102 only at specific times, for limited amounts of time, etc. Alternatively or additionally, certain roles may be restricted from accessing certain devices. Certain roles could have access to all devices. Certain roles could have the ability to pre-empt access over other roles. Policies could be in place that restricts access to all or certain sets of principals to limited periods. Various other policies, though not enumerated here, could be stored at the uniform security model store 224.

The method 300 further includes identifying a principal (act 306). For example, embodiments may identify a user 106 or software module 112 that wants to access a device. This may be due to the principal sending a device access request through the agent 100. Such a request may be initiated by using various software APIs, user interfaces, etc.

The method 300 further includes based on the identified principal, provide access to the identified principal according to the uniform security model by using the device security model (act 308). For example, as a result of a user 106 requesting access to a device, uniform security model claims may be generated or invoked based on policies stored in the uniform security model store 224. The agent 100 may use device security model credentials to request access to devices to allow access by a user 104 or application 112 to a device 102-1 according to the uniform security model.

The method 300 may be practiced where the plurality of device security models comprise device secrets. For example, the device secrets may include passwords, certificates, or the like.

The method 300 may be practiced where the uniform security model is a distributed operating system security model. In particular, a distributed operating system, that may manage resources beyond single physical machine boundaries (such as for example, large pools of physical resources and virtual resources system), could have a security model which may have various access restrictions and/or policies.

In some embodiments, the distributed operating system may be implemented in a cloud computing environment.

The method 300 may be practiced where the uniform security model comprises principal access restrictions and/or time-based access restrictions. For example, certain roles may be restricted to accessing devices only at specific times, for limited amounts of time, etc. Alternatively or additionally, certain roles may be restricted from accessing certain devices. Certain roles could have access to all devices. Certain roles could have the ability to pre-empt access over other roles. Polices could be in place the restricts access to all or certain sets of principals to limited periods The method 300 may further include identifying conflicting access requests by different principals to one or more devices and arbitrating such conflicting access requests. For example, the conflicting access requests may include a plurality of end users requesting conflicting access to one or more devices. Alternatively or additionally, the conflicting access requests may include a plurality of software principals requesting conflicting access to one or more devices. Alternatively or additionally, conflicting access requests comprise at least one software principal and one end user requesting conflicting access to one or more devices. For example, various combinations of principals may request access to devices 102 through the agent 100. Such combinations may include combinations of end users, such as end user 106 or software principals such as the application 112. Embodiments may have decision engines and rules, or other functionality, for determining how conflicting accesses are resolved.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of providing a uniform security model to heterogeneous devices in a distributed computing environment, the distributed environment including at least one processor and a distributed operating system that manages the devices, the method comprising:
    storing information about a plurality of device security models including credentials for accessing one or more devices;
    storing information about a uniform security model, the uniform security model defining which access rights various principals have to the one or more devices;
    identifying a principal; and
    the distributed operating system providing an agent which accesses the one or more devices according to the uniform security model on behalf of the identified principal by using one or more stored credentials from the device security models, wherein the distributed operating system prevents the principals from directly accessing the one or more devices such that commands entered by the identified principal are provided as commands to the agent which executes the commands on behalf of the identified principal.

2. The method of claim 1, wherein the plurality of device security models comprise device secrets.

3. The method of claim 1, wherein the uniform security model is a distributed operating system security model.

4. The method of claim 1, wherein the uniform security model comprises principal access restrictions.

5. The method of claim 1, wherein the uniform security model comprises time-based access restrictions.

6. The method of claim 1, further comprising identifying conflicting access requests by different principals to one or more devices and arbitrating such conflicting access requests.

7. The method of claim 6, wherein the conflicting access requests comprise a plurality of end users requesting conflicting access to one or more devices.

8. The method of claim 6, wherein the conflicting access requests comprise a plurality of software principals requesting conflicting access to one or more devices.

9. The method of claim 6, wherein the conflicting access requests comprise at least one software principal and one end user requesting conflicting access to one or more devices.

10. A computer system for providing a uniform security model to heterogeneous devices in a distributed computing environment, the distributed environment including a distributed operating system that manages the devices, the system comprising:
    one or more hardware processors;
    one or more computer readable media coupled to the one or more processors, wherein the one or more computer readable media comprise computer executable instructions that when executed by at least one of the one or more processors causes at least one of the one or more processors to perform the following:

storing information about a plurality of device security models including credentials for accessing one or more devices;

storing information about a uniform security model, the uniform security model defining which access rights various principals have to the one or more devices;

identifying a principal; and the distributed operating system providing an agent which accesses the one or more devices according to the uniform security model on behalf of the identified principal by using one or more stored credentials from the device security models, wherein the distributed operating system prevents the principals from directly accessing the one or more devices such that commands entered by the identified principal are provided as commands to the agent which executes the commands on behalf of the identified principal.

11. The computer system of claim 10, wherein the plurality of device security models comprise device secrets.

12. The computer system of claim 10, wherein the uniform security model is a distributed operating system security model.

13. The computer system of claim 10, wherein the uniform security model comprises principal access restrictions.

14. The computer system of claim 10, wherein the uniform security model comprises time-based access restrictions.

15. The computer system of claim 10, further comprising identifying conflicting access requests by different principals to one or more devices and arbitrating such conflicting access requests.

16. The computer system of claim 15, wherein the conflicting access requests comprise a plurality of end users requesting conflicting access to one or more devices.

17. The computer system of claim 15, wherein the conflicting access requests comprise a plurality of software principals requesting conflicting access to one or more devices.

18. The computer system of claim 15, wherein the conflicting access requests comprise at least one software principal and one end user requesting conflicting access to one or more devices.

19. A system for providing a uniform security model to heterogeneous devices in a distributed computing environment, the system comprising:

a plurality of physical machine nodes in a distributed system;

a plurality of distributed system devices, the distributed devices being usable by any of the nodes in the plurality of nodes in the distributed system;

a distributed operating system configured to manage the plurality of physical machine nodes in the distributed system, the distributed operating system being deployed on the plurality of physical machine nodes;

a device security model store storing information about a plurality of device security models for the plurality of distributed system devices credentials for a plurality of devices in the distributed system;

a uniform security model store storing information about a uniform security model defining access restrictions and permissions for principals, including at least one of users or applications using the distributed operating system; and wherein the distributed operating system provides an agent which accesses the devices according to the uniform security model on behalf of the identified principal by using the credentials from the device security models, the distributed operating system preventing the principals from directly accessing the one or more devices such that commands entered by the identified principal are provided as commands to the agent which executes the commands on behalf of the identified principal.

20. The system of claim 19, further comprising one or more modules configured to audit use of the distributed system devices through the distributed operating system.

* * * * *